United States Patent
Retersdorf et al.

(10) Patent No.: US 12,031,481 B2
(45) Date of Patent: Jul. 9, 2024

(54) AIR BOTTOMING CYCLE AIR CYCLE SYSTEM SOURCE

(71) Applicant: RTX CORPORATION, Farmington, CT (US)

(72) Inventors: Alan Retersdorf, Avon, CT (US); Stephen H. Taylor, East Hartford, CT (US); Oliver V. Atassi, Longmeadow, MA (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/459,716

(22) Filed: Sep. 1, 2023

(65) Prior Publication Data

US 2024/0102418 A1 Mar. 28, 2024

Related U.S. Application Data

(63) Continuation of application No. 17/951,936, filed on Sep. 23, 2022, now Pat. No. 11,773,778.

(51) Int. Cl.
*F02C 6/18* (2006.01)
*F02C 7/32* (2006.01)
*F02C 9/18* (2006.01)

(52) U.S. Cl.
CPC ............... *F02C 6/18* (2013.01); *F02C 7/32* (2013.01); *F02C 9/18* (2013.01); *F05D 2220/62* (2013.01); *F05D 2260/10* (2013.01); *F05D 2260/213* (2013.01); *F05D 2260/232* (2013.01)

(58) Field of Classification Search
CPC ..... F02C 9/18; F02C 6/18; F02C 6/08; B64D 2013/0648; B64D 2013/0618
See application file for complete search history.

(56) References Cited

U.S. PATENT DOCUMENTS

| | | | |
|---|---|---|---|
| 9,014,791 B2 | 4/2015 | Held | |
| 11,434,824 B2 | 9/2022 | Rambo et al. | |
| 2013/0086927 A1 | 4/2013 | Mills | |
| 2015/0166187 A1 | 6/2015 | Durbin et al. | |
| 2016/0369695 A1 | 12/2016 | Perlak et al. | |
| 2018/0057171 A1 | 3/2018 | Sautron | |
| 2018/0057172 A1 | 3/2018 | Sautron | |
| 2018/0370636 A1 | 12/2018 | Laborde et al. | |
| 2019/0257247 A1 | 8/2019 | Pal et al. | |
| 2020/0355121 A1 | 11/2020 | O'Meallie et al. | |
| 2021/0301720 A1 | 9/2021 | Staubach et al. | |
| 2022/0145796 A1 | 5/2022 | Hallisey et al. | |

FOREIGN PATENT DOCUMENTS

EP 1186761 A2 3/2002

OTHER PUBLICATIONS

European Search Report for European Application No. 23199536.6 mailed Feb. 28, 2024.

*Primary Examiner* — David P. Olynick
(74) *Attorney, Agent, or Firm* — Carlson, Gaskey & Olds, P.C.

(57) ABSTRACT

A turbine engine assembly includes a tap is at a location upstream of the combustor section where a bleed airflow is drawn. The bleed air is pressurized in an auxiliary compressor section, heated in an exhaust heat exchanger, and expanded through a power turbine that is coupled to drive the auxiliary compressor section.

15 Claims, 4 Drawing Sheets

AIR BOTTOMING CYCLE AIR CYCLE SYSTEM SOURCE

CROSS REFERENCE TO RELATED APPLICATION

This application is a continuation of U.S. patent application Ser. No. 17/951,936 filed Sep. 23, 2022.

TECHNICAL FIELD

The present disclosure relates generally to a turbine engine including a waste heat recovery system that conditions air for use by an air cycle system.

BACKGROUND

Reduction and/or elimination of carbon emissions generated by aircraft operation is a stated goal of aircraft manufacturers and airline operators. Turbine engines compress incoming core airflow, mix the compressed airflow with fuel that is ignited in a combustor to generate a high energy exhaust gas flow. Some energy in the high energy exhaust flow is recovered as it is expanded through a turbine section. Even with the use of alternate fuels, a large amount of energy in the form of heat is simply exhausted from the turbine section to atmosphere. The lost heat reduces the overall efficiency of the engine.

Turbine engine manufacturers continue to seek further improvements to engine performance including improvements to reduce environmental impact while improving thermal and propulsive efficiencies.

SUMMARY

A turbine engine assembly according to an exemplary embodiment of this disclosure, among other possible things includes a core engine that includes a core flow path where a core airflow is compressed in a main compressor section, communicated to a combustor section, mixed with fuel, and ignited to generate an exhaust gas flow that is expanded through a turbine section. The turbine section is coupled to drive the main compressor section through an engine drive shaft. The turbine engine assembly further includes a tap at a location upstream of the combustor section where a bleed airflow is drawn, an auxiliary compressor section where the bleed airflow is pressurized, an exhaust heat exchanger where a portion of the bleed airflow is heated by the exhaust gas flow, a power turbine that is coupled to drive the auxiliary compressor section and is driven by heated bleed airflow from the exhaust heat exchanger, and an accessory system that receives pressurized airflow from the auxiliary compressor section.

In a further embodiment of the foregoing, the auxiliary compressor section includes a first compressor and a second compressor that are both coupled to the power turbine. A first compressed airflow from the first compressor is communicated to the second compressor and a second compressed airflow from the first compressor is communicated to the exhaust heat exchanger, and the compressed airflow from the second compressor is communicated to the accessory system.

In a further embodiment of any of the foregoing, the turbine engine includes a bleed air heat exchanger where the second compressed airflow from the second compressor is cooled before being communicated to the accessory system.

In a further embodiment of any of the foregoing, the first compressed airflow is placed in thermal communication with the second compressed airflow in the bleed air heat exchanger.

In a further embodiment of any of the foregoing, the tap is disposed forward of the main compressor section.

In a further embodiment of any of the foregoing, the main compressor section includes a low pressure compressor section and a high pressure compressor section and the tap draws a bleed airflow after the low pressure compressor section and before the high pressure compressor section.

In a further embodiment of any of the foregoing, the turbine engine includes a first control valve that controls bleed airflow from the tap to the auxiliary compressor section.

In a further embodiment of any of the foregoing, the turbine engine includes a thermal transfer system where a heat transfer medium in a closed circuit provides thermal communication between heat from the exhaust gas flow and the bleed airflow.

In a further embodiment of any of the foregoing, the thermal transfer system includes a pump for pumping the heat transfer medium and a system heat exchanger for transferring thermal energy between the heat transfer medium and the bleed airflow.

In a further embodiment of any of the foregoing, a heated bleed airflow from the system heat exchanger is communicated to the power turbine.

In a further embodiment of any of the foregoing, the accessory system includes an aircraft environmental control system.

A waste heat recovery system for a turbine engine according to another exemplary embodiment of this disclosure, among other possible things includes a tap that is at a location upstream of a combustor where a bleed airflow is drawn, an auxiliary compressor section where the bleed airflow is compressed, an exhaust heat exchanger where a portion of the bleed airflow is heated by an exhaust gas flow, a power turbine that is coupled to drive the auxiliary compressor section and is driven by heated bleed airflow, and an accessory system that receives pressurized airflow from the auxiliary compressor section.

In a further embodiment of the foregoing, the auxiliary compressor section includes a first compressor and a second compressor that are both coupled to the power turbine. A first compressed airflow from the first compressor is communicated to the second compressor and a second compressed airflow from the first compressor is communicated to the exhaust heat exchanger, and a compressed airflow from the second compressor is communicated to the accessory system.

In a further embodiment of any of the foregoing, the waste heat recovery system includes a bleed air heat exchanger where the compressed bleed airflow is cooled before being communicated to the accessory system.

In a further embodiment of any of the foregoing, the tap is disposed forward of the main compressor section.

In a further embodiment of any of the foregoing, the main compressor section includes a low pressure compressor section and a high pressure compressor section and the tap draws a bleed airflow after the low pressure compressor section and before the high pressure compressor section.

In a further embodiment of any of the foregoing, the waste heat recovery system includes a thermal transfer system where a heat transfer medium in a closed circuit provides thermal communication between heat from the exhaust gas flow and the bleed airflow. The thermal transfer system includes a pump for pumping the heat transfer medium and a system heat exchanger for transferring thermal energy between the heat transfer medium and the bleed airflow.

A method of operating a turbine engine assembly according to an exemplary embodiment of this disclosure, that among other possible things, includes tapping a bleed airflow from a location upstream of at least a portion of the main compressor section, compressing the bleed airflow in an auxiliary compressor section, heating the bleed airflow in an exhaust heat exchanger, driving the auxiliary compressor with a power turbine by expanding the heated bleed airflow through the power turbine, and supplying a portion of compressed bleed airflow to an air cycle system.

In a further embodiment of the foregoing, the method includes cooling the bleed airflow in a bleed air heat exchanger before communicating the bleed airflow to the air cycle system.

In a further embodiment of any of the foregoing, the method includes transferring thermal energy from the exhaust gas flow into the bleed airflow with a thermal transfer medium circulating within a closed system.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
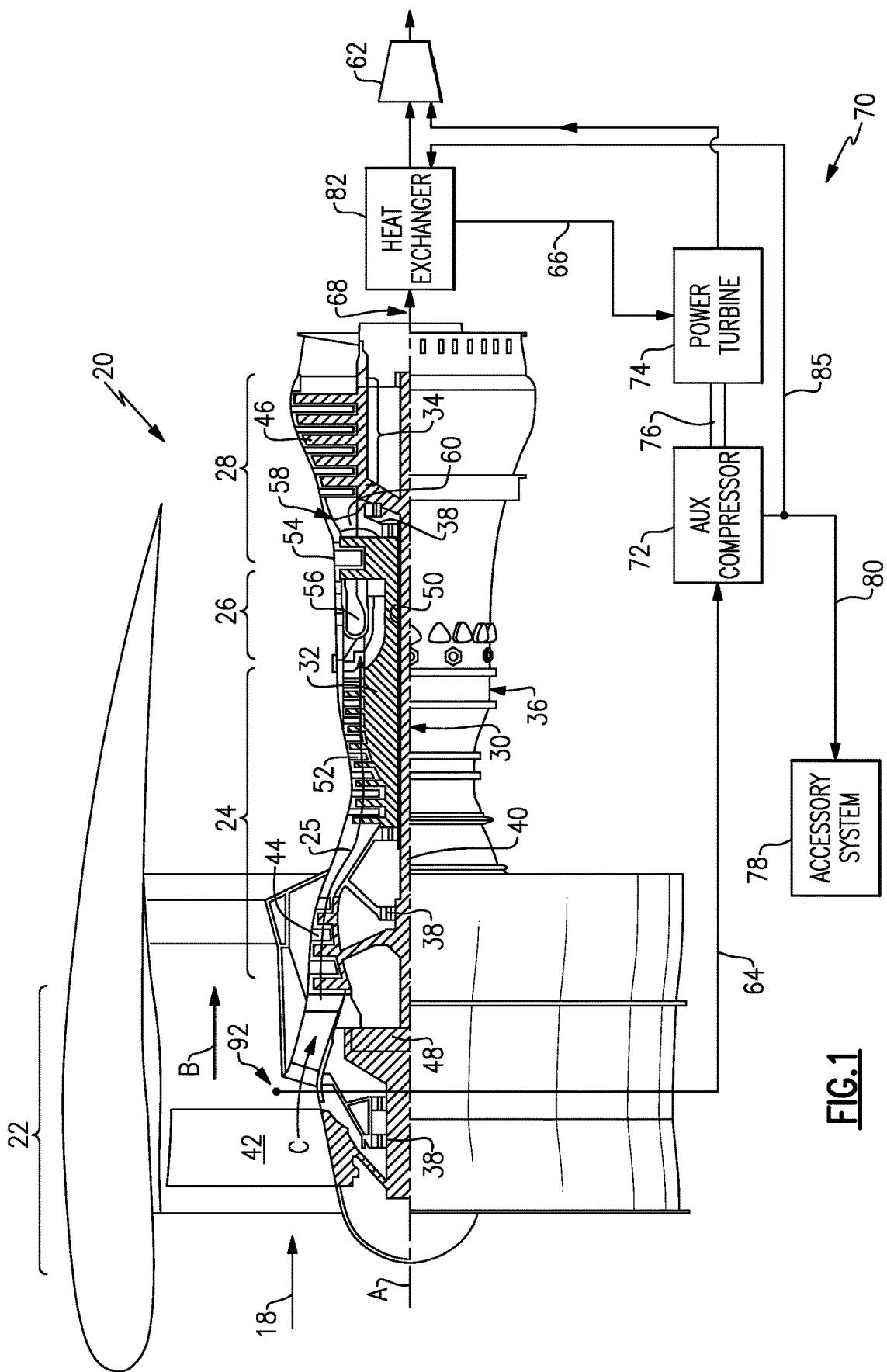
FIG. 1 is a schematic view of an example turbine engine embodiment.

FIG. 1 schematically illustrates an example turbine engine 20 that includes a waste heat recovery system 70 that provides air to an air cycle system. Inlet airflow is compressed by an auxiliary compressor 72 driven by a power turbine 74. The power turbine 74 is driven through expansion of a heated bleed airflow. The bleed airflow is drawn from a location upstream of at least a portion of a main engine compressor section 24 (e.g., upstream of a high-pressure compressor section 52, the low-pressure compressor section 44, etc.). Waste heat is used to heat the bleed airflow that drives the power turbine 74 without incurring significant additional loads on the turbine engine 20. The bleed airflow may also be drawn from a location after the compressor section 24.

The example turbine engine includes a fan section 22, a compressor section 24, a combustor section 26 and a turbine section 28. The fan section 22 drives inlet air 18 along a bypass flow path B, while the compressor section 24 draws air in along a core flow path C where a core airflow 25 is compressed and communicated to a combustor section 26. In the combustor section 26, air is mixed with fuel and ignited to generate a high energy gas flow 68 that expands through the turbine section 28 where energy is extracted and utilized to drive the fan section 22 and the compressor section 24.

Although the disclosed non-limiting embodiment depicts a two-spool turbofan turbine engine, it should be understood that the concepts described herein are not limited to use with two-spool turbofans as the teachings may be applied to other types of turbine engines. For example, a turbine engine may include a three-spool architecture in which three spools concentrically rotate about a common axis and where a low spool enables a low-pressure turbine to drive a fan via a gearbox, an intermediate spool that enables an intermediate pressure turbine to drive a first compressor of the compressor section, and a high spool that enables a high-pressure turbine to drive a high-pressure compressor of the compressor section.

The example engine 20 generally includes a low-speed spool 30 and a high-speed spool 32 mounted for rotation about an engine central longitudinal axis A relative to an engine static structure 36 via several bearing systems 38. It should be understood that various bearing systems 38 at various locations may alternatively or additionally be provided.

The low-speed spool 30 generally includes an inner shaft 40 that connects a fan 42 and a low-pressure (or first) compressor section 44 to a low-pressure (or first) turbine section 46. The inner shaft 40 drives the fan section 22 through a speed change device, such as a geared architecture 48, to drive the fan section 22 at a lower speed than the low-speed spool 30. The high-speed spool 32 includes an outer shaft 50 that interconnects a high-pressure (or second) compressor section 52 and a high-pressure (or second) turbine section 54. The inner shaft 40 and the outer shaft 50 are concentric and rotate via the bearing systems 38 about the engine central longitudinal axis A.

A combustor 56 is arranged between the high-pressure compressor 52 and the high-pressure turbine 54. In one example, the high-pressure turbine 54 includes at least two stages to provide a double stage high-pressure turbine 54. In another example, the high-pressure turbine 54 includes only a single stage. As used herein, a "high-pressure" compressor or turbine experiences a higher pressure than a corresponding "low-pressure" compressor or turbine.

The example low-pressure turbine 46 has a pressure ratio that is greater than about 5. The pressure ratio of the example low-pressure turbine 46 is measured prior to an inlet of the low-pressure turbine 46 as related to the pressure measured at the outlet of the low-pressure turbine 46 prior to an exhaust nozzle.

A mid-turbine frame 58 of the engine static structure 36 is arranged generally between the high-pressure turbine 54 and the low-pressure turbine 46. The mid-turbine frame 58 further supports bearing systems 38 in the turbine section 28 as well as setting airflow entering the low-pressure turbine 46.

The core airflow 25 through the core airflow path C is compressed by the low-pressure compressor 44 then by the high-pressure compressor 52, mixed with fuel and ignited in the combustor 56 to produce high energy hot exhaust gases that are expanded through the high-pressure turbine 54 and low-pressure turbine 46. The mid-turbine frame 58 includes vanes 60, which are in the core airflow path and function as an inlet guide vane for the low-pressure turbine 46. Utilizing the vane 60 of the mid-turbine frame 58 as the inlet guide vane for low-pressure turbine 46 decreases the length of the low-pressure turbine 46 without increasing the axial length of the mid-turbine frame 58. Reducing or eliminating the number of vanes in the low-pressure turbine 46 shortens the axial length of the turbine section 28. Thus, the compactness of the turbine engine 20 is increased and a higher power density may be achieved.

The disclosed turbine engine 20 in one example is a high-bypass geared aircraft engine. In a further example, the turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the turbine engine 20 includes a bypass ratio greater than about ten (10:1) and the fan diameter is significantly larger than an outer diameter of the low-pressure compressor 44. It should be understood, however, that the above parameters are only exemplary of one embodiment of a turbine engine including a geared architecture and that the present disclosure is applicable to other turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment, the low fan pressure ratio is less than about 1.45.

"Low corrected fan tip speed" is the actual fan tip speed in ft/sec divided by an industry standard temperature correction of $[(Tram \,° R)/(518.7° R)]0.5$. The "Low corrected fan tip speed", as disclosed herein according to one non-limiting embodiment, is less than about 1150 ft/second.

The example turbine engine includes the fan section 22 that comprises in one non-limiting embodiment less than about 26 fan blades 42. In another non-limiting embodiment, the fan section 22 includes less than about 20 fan blades 42. Moreover, in one disclosed embodiment the low-pressure turbine 46 includes no more than about 6 turbine rotors schematically indicated at 34. In another non-limiting example embodiment, the low-pressure turbine 46 includes about 3 turbine rotors. A ratio between the number of fan blades 42 and the number of low-pressure turbine rotors is between about 3.3 and about 8.6. The example low-pressure turbine 46 provides the driving power to rotate the fan section 22 and therefore the relationship between the number of turbine rotors 34 in the low-pressure turbine 46 and the number of blades 42 in the fan section 22 disclose an example turbine engine 20 with increased power transfer efficiency.

Thermal energy produced through the combustion process is typically wasted by venting the exhausted gas flow 68 to atmosphere through a nozzle 62 after expansion through the turbine section 28. This thermal energy vented to atmosphere can be used to produce a power output that is used to drive other systems.

The example waste heat recovery system 70 utilizes thermal energy from the exhaust gas flow 68 to heat the bleed airflow 64 drawn from a tap 92. The bleed airflow 64 is compressed in an auxiliary compressor section 72. A portion of the compressed bleed airflow 80 is communicated to an accessory system 78. The example accessory system 78 may be an environmental control system used by the aircraft and/or a deicing system that uses heated air to prevent icing on surfaces of the aircraft. Although the example accessory system 78 is described by way of example as an environmental control system or a deicing system, other engine or aircraft systems that utilize a bleed airflow would also benefit from this disclosure.

A portion of the compressed bleed airflow 85 is heated in the exhaust heat exchanger 82. The compressed and heated bleed airflow 66 is expanded through the power turbine 74 to drive a shaft 76 coupled to drive the auxiliary compressor section 72. Accordingly, the power required to compress the bleed airflow to the pressure required by accessory system 78 comes in part from waste heat of the exhaust. Work produced by the power turbine 74 offsets compression that would be performed in the compressor section of the engine and thereby increases engine thermal efficiency Referring to FIG. 2, with continued reference to FIG. 1, the example engine 20 is shown schematically and includes a tap 92 from which a bleed airflow 64 is drawn. In one disclosed example, the tap 92 is provided forward of the compressor section 24 of the engine 20. The bleed airflow 64 may also be drawn from another source of inlet air as indicated at 94 that is separate from the engine 20. Moreover, in another example embodiment, bleed airflow 64 may be drawn from the tap 92 and also communicated from the source 94. A valve 90 may be provided to control the flow rate or pressure of the bleed airflow 64 drawn into the system 70. The valve 90 may be an on/off valve and/or may be a proportional valve to vary bleed airflow between on and off flow conditions for tailoring bleed flow rate or pressure to system demands.

In one disclosed example, the auxiliary compressor section 72 includes a first auxiliary compressor 84 and a second auxiliary compressor 86. Bleed airflow 64 drawn from the tap 92 and/or the ram air source 94 may not be at a pressure required for use in the system 78. The first auxiliary compressor 84 receives the bleed airflow 64 and compresses the airflow to provide a pressurized bleed airflow. A portion of the pressurized bleed airflow 80 is fed to the second auxiliary compressor 86 for further compression. Compressed bleed airflow from the second auxiliary compressor 86 is routed to the system 78. Compressed bleed airflow 85 from the first compressor section 84 is communicated to power turbine 74 after being heated in an exhaust heat exchanger 82. The heated bleed airflow 66 is expanded through the power turbine 74 to drive the first and second auxiliary compressor sections 84, 86. In one disclosed example, the power turbine 74 drives both the first auxiliary compressor 84 and the second auxiliary compressor 86 through a common shaft 76.

The compressed bleed airflow 85 is pre-heated in a bleed air heat exchanger 88. The bleed air heat exchanger 88 cools the bleed airflow 96 that is routed to the system 78 by transferring heat into the flow 85 that is communicated to exhaust heat exchanger 82. The combination of additional pressurization in the second auxiliary compressor 86 and cooling in the bleed air heat exchanger 88 conditions the pressurized and cooled bleed airflow 96 according to defined requirements by the system 78. The pressure and temperature of the bleed airflow 96 may vary depending on system requirements.

Figure 2:
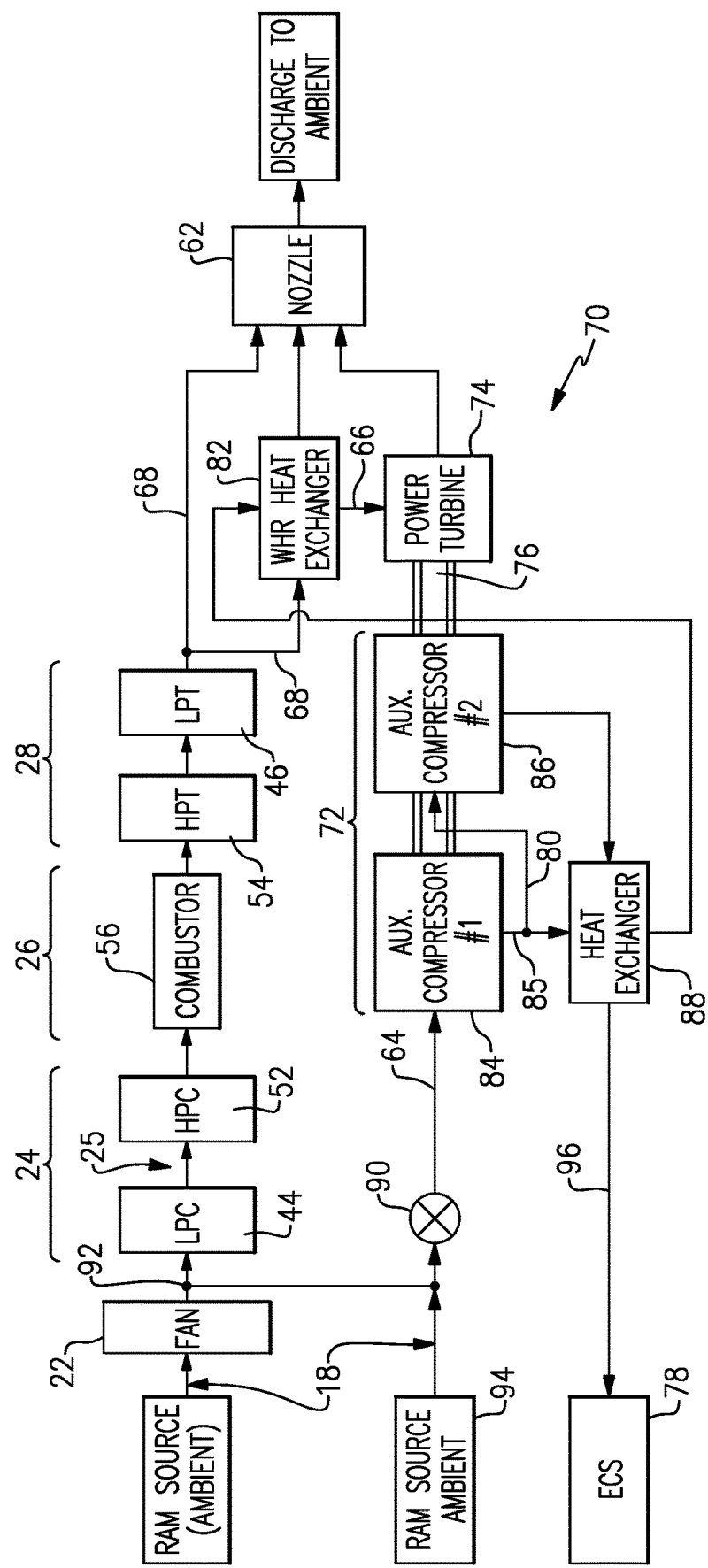
FIG. 2 is a simplified schematic view of the example turbine engine embodiment of FIG. 1.

The exhaust heat exchanger 82 is shown out of the axial exhaust flow path aft of the turbine section 28. However, the heat exchanger 82 may be aligned along the axis A of the engine as shown in FIG. 1 or disposed outside of the axis A as is shown in FIG. 2. In either configuration, the exhaust heat exchanger 82 receives a portion of the exhaust gas flow 68 and communicates heat into the bleed airflow. The heated bleed airflow 66 recovers heat energy that would otherwise be exhausted to the ambient environment through the nozzle 62.

Figure 3:
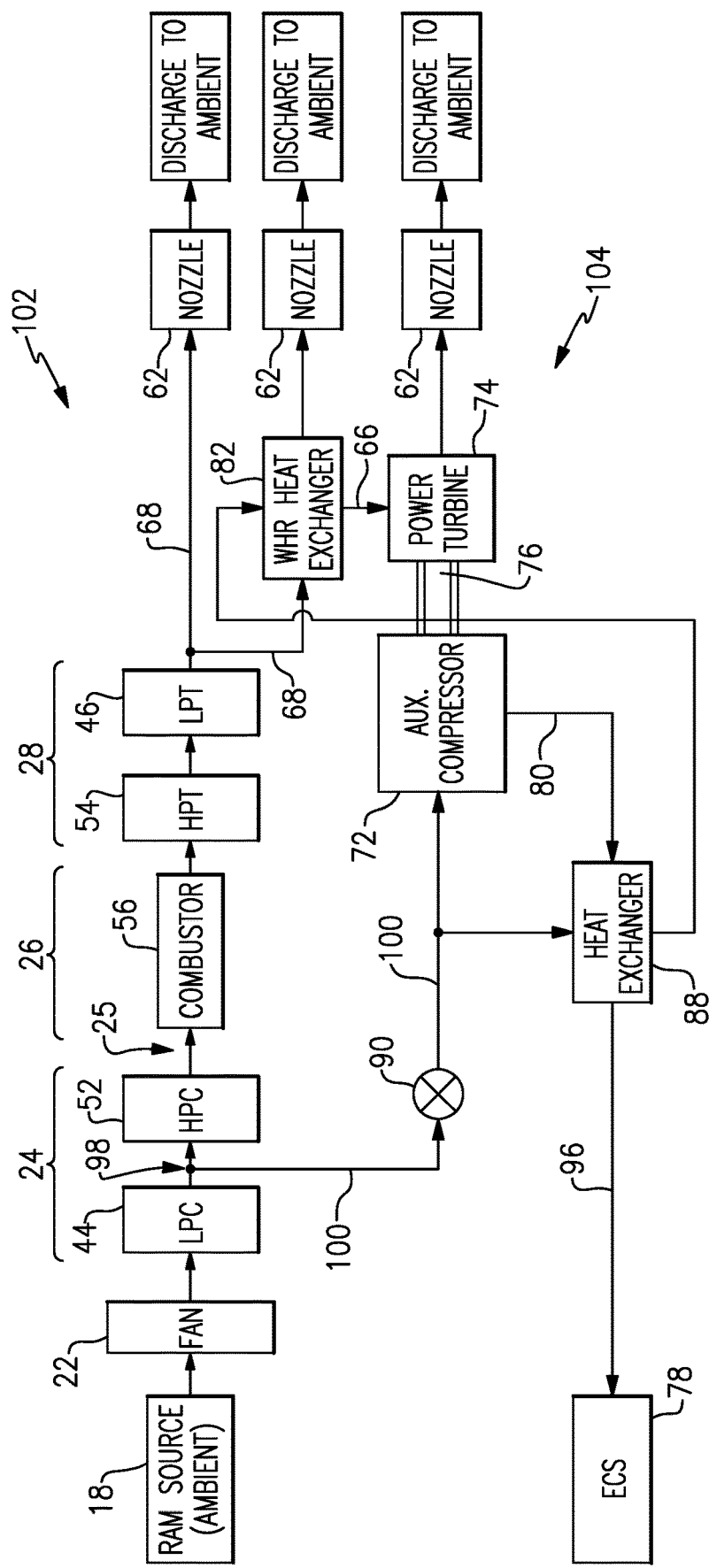
FIG. 3 is a schematic view of another example turbine engine embodiment.

Referring to FIG. 3, another example engine embodiment is schematically shown and generally indicated at 102. The engine 102 includes a waste heat recovery system 104 that includes a tap 98 that draws a bleed airflow 100 from a location within the main compressor section 24. In one example embodiment, the tap 98 draws the bleed airflow 100 after the LPC 44 and before the HPC 52. The bleed airflow 100 is therefore of a pressure higher than the inlet airflow 18. Although one disclosed example tap 98 is located between the LPC 44 and the HPC 52, the tap 98 maybe located to draw the bleed airflow 100 from anywhere in the compressor section 24 that is determined to provided desired pressures and temperatures for use by the waste heat recovery system 104 and the system 78.

Bleed airflow compressed in the auxiliary compressor 72 is communicated to the system 78. Bleed airflow 100 directly from the tap 98 is pre-heated in the bleed air heat exchanger 88 and communicated to the exhaust heat exchanger 82. Heated bleed airflow 66 from the heat exchanger 88 is expanded through the power turbine 74 to drive the auxiliary compressor section 72. In this embodiment, the bleed flow 100 is already at an elevated pressure at the tap 98, therefore requiring less compression than bleed flow from a lower pressure tap off such as tap 92 or source 94. Because the bleed airflow 100 is already of an elevated pressure, the auxiliary compressor section 72, exhaust heat exchanger 82, and the power turbine 74 may be smaller and of less capacity while still supplying the bleed airflow 96 to the system 78 at predefined and required pressure and temperature.

The system 104 includes the valve 90 that provides for controlling the bleed airflow 100 drawn from the compressor section 24.

Figure 4:
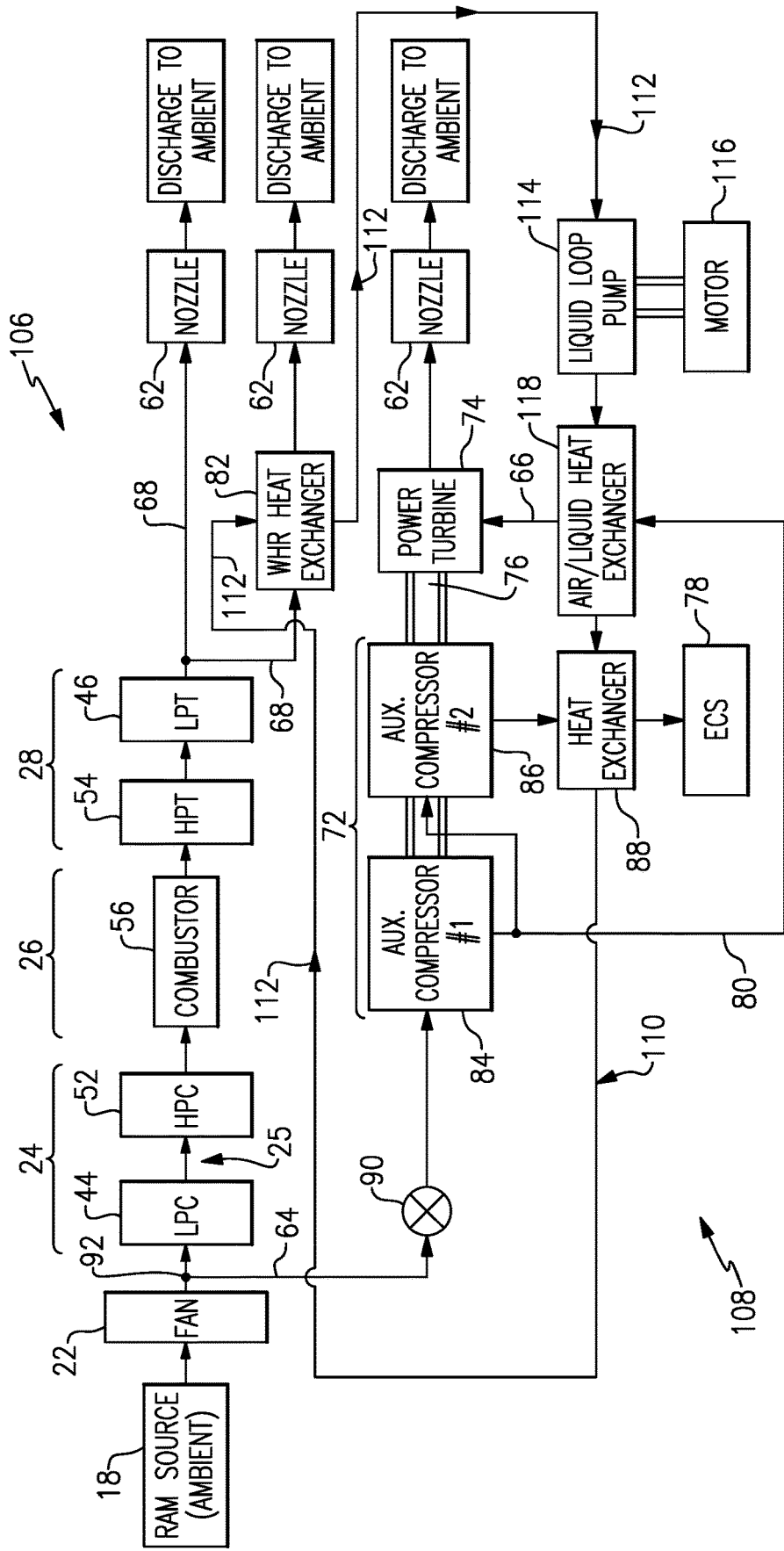
FIG. 4 is a schematic view of yet another example turbine engine embodiment.

Referring to FIG. 4, another example engine embodiment is schematically shown and indicated at 106. The engine 106 includes waste heat recovery system 108 with a closed loop thermal transfer system 110. The thermal transfer system 110 uses a thermal transfer medium 112 within a closed circuit to transfer thermal energy from the exhaust gas flow 68 to the bleed airflow 64 drawn from the tap 92. In this disclosed example, the tap 92 is disposed at a location forward of the compressor section 24 such that the bleed airflow 64 is similar in pressure and temperature to the inlet airflow 18. It should be understood, that the tap 92 may be provided at other locations with this example engine embodiment 106, such as within the compressor section 24 as previously described (e.g., with respect to tap 98).

The thermal transfer system 110 includes a pump 114 driven by a motor 116 to circulate the thermal transfer medium 112 through the closed circuit. The motor 116 may be an electric motor, hydraulic motor or be embodied as a mechanical link to the power turbine shaft 76 driven by an accessory gearbox or by a mechanical coupling to one of the engine shafts. The thermal transfer medium 112 may be any medium compatible with the temperatures encountered at various locations within the circuit while providing for the efficient transfer of thermal energy.

The system 110 circulates the thermal transfer medium 112 through the exhaust heat exchanger 82 where it is heated and pumped to an air/liquid heat exchanger 118. In the air/liquid heat exchanger 118, heat from the thermal transfer medium 112 is transferred into the pressurized bleed airflow 80. The heated and pressurized bleed airflow 66 is expanded through the power turbine 74 to drive the auxiliary compressor 72. The thermal transfer medium 112 exhausted from the air/liquid heat exchanger 118 may then be routed to a bleed air heat exchanger 88 where the bleed air is cooled prior to communication to the system 78. The thermal transfer medium 112 from the bleed air heat exchanger 88 is then routed back to the exhaust heat exchanger 82 where the thermal energy transfer cycle is repeated.

The thermal transfer system 110 provides flexibility in the location and size of each of the bleed air components to accommodate engine mounting limitations and reduce the complexity of air ducting for routing of the bleed airflow 64. The example thermal transfer system 110 may also be utilized in concert with other heat generating systems of the engine to communicate thermal energy into and from the bleed airflow used for the system 78.

Accordingly, the disclosed example waste heat recovery systems provide for the accumulation, transfer, and recovery of thermal energy from the exhaust gas flow a to drive a power turbine to drive an auxiliary compressor section to condition a bleed airflow for an air cycle system. The disclosed assemblies provide for the advantageous reclamation of heat energy for production of power and thereby improve overall engine efficiency.

Although example embodiments have been disclosed, a worker of ordinary skill in this art would recognize that certain modifications would come within the scope of this disclosure. For that reason, the following claims should be studied to determine the scope and content of this disclosure.

What is claimed is:

1. A turbine engine assembly comprising:
   a core engine including a core flow path where a core airflow is compressed in a main compressor section, communicated to a combustor section, mixed with fuel, and ignited to generate an exhaust gas flow that is expanded through a turbine section, wherein the turbine section is coupled to drive the main compressor section through an engine drive shaft;
   a tap at a location upstream of the combustor section where a bleed airflow is drawn;
   an auxiliary compressor section where a first portion of the bleed airflow is pressurized to generate a first compressed airflow;
   a bleed air heat exchanger where a second portion of the bleed airflow directly from the tap is preheated;
   an exhaust heat exchanger where the preheated second portion of the bleed airflow is heated by the exhaust gas flow;
   a power turbine coupled to drive the auxiliary compressor section and driven by heated bleed airflow from the exhaust heat exchanger; and
   an accessory system receiving pressurized airflow from the auxiliary compressor section.

2. The turbine engine assembly as recited in claim 1, wherein the tap is disposed forward of the main compressor section.

3. The turbine engine assembly as recited in claim 1, wherein the main compressor section includes a low pressure compressor section and a high pressure compressor section and the tap draws the bleed airflow after the low pressure compressor section and before the high pressure compressor section.

4. The turbine engine assembly as recited in claim 1, including a first control valve controlling bleed airflow from the tap to the auxiliary compressor section.

5. The turbine engine assembly as recited in claim 1, including a thermal transfer system where a heat transfer medium in a closed circuit provides thermal communication between heat from the exhaust gas flow and the bleed airflow.

6. The turbine engine assembly as recited in claim 5, wherein the thermal transfer system includes a pump for pumping the heat transfer medium and a system heat exchanger for transferring thermal energy between the heat transfer medium and the bleed airflow.

7. The turbine engine assembly as recited in claim 6, wherein a heated bleed airflow from the system heat exchanger is communicated to the power turbine.

8. The turbine engine assembly as recited in claim 1, wherein the accessory system comprises an aircraft environmental control system.

9. The turbine engine assembly as recited in claim 1, wherein the first compressed airflow is placed in thermal communication with the second portion of the bleed airflow in the bleed air heat exchanger.

10. A waste heat recovery system for a turbine engine, the waste heat recovery system comprising:
a tap at a location upstream of a combustor where a bleed airflow is drawn;
an auxiliary compressor section where the bleed airflow is compressed;
a bleed air heat exchanger where the compressed bleed airflow is cooled by a second portion of the bleed airflow drawn from the tap;
an exhaust heat exchanger where the second portion of the bleed airflow is heated by an exhaust gas flow;
a power turbine coupled to drive the auxiliary compressor section and driven by heated bleed airflow; and
an accessory system receiving pressurized airflow from the auxiliary compressor section.

11. The waste heat recovery system as recited in claim 10, wherein the tap is disposed forward of the main compressor section.

12. The waste heat recovery system as recited in claim 10, wherein the main compressor section includes a low pressure compressor section and a high pressure compressor section and the tap draws the bleed airflow after the low pressure compressor section and before the high pressure compressor section.

13. The waste heat recovery system as recited in claim 10, including a thermal transfer system where a heat transfer medium in a closed circuit provides thermal communication between heat from the exhaust gas flow and the bleed airflow, wherein the thermal transfer system includes a pump for pumping the heat transfer medium and a system heat exchanger for transferring thermal energy between the heat transfer medium and the bleed airflow.

14. A method of operating a turbine engine assembly comprising:
tapping a bleed airflow from a location upstream of at least a portion of a main compressor section;
compressing the bleed airflow in an auxiliary compressor section to generate a compressed bleed airflow;
cooling the compressed bleed airflow in a bleed air heat exchanger with a second portion of bleed airflow direct from the main compressor section;
heating the bleed airflow in an exhaust heat exchanger;
driving the auxiliary compressor with a power turbine by expanding the heated bleed airflow through the power turbine; and
supplying the compressed bleed airflow to an air cycle system after cooling in the bleed air heat exchanger.

15. The method as recited in claim 14, further comprising transferring thermal energy from the exhaust gas flow into the bleed airflow with a thermal transfer medium circulating within a closed system.

* * * * *